United States Patent
Harada (10) Patent No.: US 8,532,505 B2
(45) Date of Patent: Sep. 10, 2013

(54) PRINTING SYSTEM, PRINTING METHOD AND PROGRAM FOR EXECUTING PRINTING METHOD

(75) Inventor: Takuto Harada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 13/033,689

(22) Filed: Feb. 24, 2011

(65) Prior Publication Data

US 2011/0217050 A1 Sep. 8, 2011

(30) Foreign Application Priority Data

Mar. 3, 2010 (JP) ................................ 2010-046409

(51) Int. Cl.
*G03G 15/00* (2006.01)

(52) U.S. Cl.
USPC ........ 399/9; 399/18; 399/19; 399/81; 399/82; 399/401

(58) Field of Classification Search
USPC ...................... 399/9, 18, 19, 81, 82, 401, 407
See application file for complete search history.

(56) References Cited

U.S. PATENT DOCUMENTS

| | | | |
|---|---|---|---|
| 6,151,457 A * | 11/2000 | Kawamoto | 399/9 |
| 6,356,721 B1 * | 3/2002 | Motoyoshi et al. | 399/82 |
| 7,590,362 B2 * | 9/2009 | Yamauchi et al. | 399/18 |
| 8,011,650 B2 * | 9/2011 | Tao et al. | 270/58.09 |
| 2003/0026619 A1 * | 2/2003 | Miyoshi et al. | 399/19 |
| 2004/0184823 A1 * | 9/2004 | Fujii et al. | 399/9 |
| 2006/0056872 A1 * | 3/2006 | Hosoi | 399/81 |
| 2006/0114313 A1 * | 6/2006 | Moore | 347/262 |
| 2007/0147855 A1 * | 6/2007 | Shimada | 399/21 |
| 2007/0147867 A1 * | 6/2007 | Sekiya | 399/75 |
| 2008/0008491 A1 * | 1/2008 | Tao et al. | 399/82 |
| 2008/0063422 A1 * | 3/2008 | Iida | 399/75 |
| 2009/0041485 A1 * | 2/2009 | Shoji et al. | 399/43 |
| 2009/0097060 A1 * | 4/2009 | Okada | 358/1.15 |
| 2009/0268216 A1 * | 10/2009 | Iinuma | 358/1.4 |
| 2010/0142990 A1 * | 6/2010 | Mandel et al. | 399/107 |
| 2010/0196023 A1 * | 8/2010 | Shiozawa | 399/39 |
| 2010/0196024 A1 * | 8/2010 | Shiozawa | 399/39 |
| 2011/0135365 A1 * | 6/2011 | Oak et al. | 399/407 |
| 2011/0158673 A1 * | 6/2011 | Mizuno | 399/75 |
| 2011/0170123 A1 * | 7/2011 | Ito | 358/1.9 |

FOREIGN PATENT DOCUMENTS

| | | | |
|---|---|---|---|
| JP | 11327839 A | * | 11/1999 |
| JP | 2007-011028 | | 1/2007 |
| JP | 2008-139589 | | 6/2008 |
| JP | 2008-145595 | | 6/2008 |

* cited by examiner

*Primary Examiner* — Walter L Lindsay, Jr.
*Assistant Examiner* — David Bolduc
(74) *Attorney, Agent, or Firm* — Fitzpatrick, Cella, Harper & Scinto (57) ABSTRACT

In a printing apparatus, first printing data used for the first printing apparatus to perform a print is associated with second printing data generated from the same print job as the first printing data. A printing apparatus detects an operating state of the apparatus. The printing apparatus, when the detected operating state shows generation of an error and the error is not removed, in a case where it is determined that a job inputted into a printing system and associated is not completed, displays information in regard to a removal method of the error on an I/F. In addition, the printing apparatus notifies the printing apparatus of generation information of the error. The printing apparatus displays the information showing that the error is generated on an I/F.

12 Claims, 7 Drawing Sheets

PRINTING SYSTEM, PRINTING METHOD AND PROGRAM FOR EXECUTING PRINTING METHOD

BACKGROUND OF THE INVENTION

1. Field of the Invention

The present invention relates to a setting and a display of a user interface in a printing system in which two independent printing apparatuses are connected and cooperate to produce one output matter.

2. Description of the Related Art

There has been recently proposed an electro-photographic apparatus using a clear toner as a special printing agent. The clear toner is a transparent printing agent for producing an image having transparency.

Use of this clear toner allows various types of expressions, making it possible to improve an added value of the output matter. For example, there is an electro-photographic apparatus in which an apparatus for adding a clear toner in addition to colored toners such as CMYK and the like is installed to enable production of an output matter using the clear toner. However, if this type of electro-photographic apparatus performs a print using a special printing agent such as the clear toner, there may occur a problem that a total toner amount thereof used for printing remarkably increases as compared to that of the conventional print using toners of four colors.

Particularly when applying the special printing agent such as the clear toner to a color print of an electro-photographic system, a special printing agent image in addition to a conventional image by toners of four colors of C, M, Y and K is formed on an intermediate transcriptional element and it is necessary to further transcript it on a sheet.

In consequence, an amount of toners necessary for printing at each process increases, thus applying large loads at each process.

For overcoming this problem, for example, Japanese Patent Laid-Open No. 2007-011028 discloses a method of calculating an application amount printable by a special printing agent based upon an application amount of the four-color toners of C, M, Y and K.

However, if the application amount of the special printing agent is calculated by the method disclosed in Japanese Patent Laid-Open No. 2007-011028, it may be possible that the application amount of the special printing agent becomes zero.

For example, it may be possible that a sum of the calculated application amounts of the four-color toners exceeds a total application amount appropriately fixable on a sheet in a printing apparatus.

In this case, even if a user instructs a print using a special printing agent, since the print using the special printing agent according to the user's instruction can not be performed, a visual effect by the special printing agent can not be obtained.

For overcoming this problem, Japanese Patent Laid-Open No. 2008-139589 discloses a technology that when determining that the print using the special printing agent according to the instruction of the user can not be performed by one time of fixation, a method of forming the special printing agent image is altered.

For example, first, a toner other than a special printing agent is used to print and fix an image on a sheet, which is outputted. In addition, the special printing agent is used to print and fix a special printing agent image on the outputted sheet. A print of performing twice of the fixation is called a two-pass print.

When using the two-pass print, it is possible to print using an amount of the special printing agent exceeding an amount of the special printing agent determined by taking a total application amount allowable in the printing apparatus into account. Inconsequence, an output matter having a visual effect by the special printing agent desired by a user can be obtained.

In this way, use of the apparatus for outputting the clear toner leads to the solution for the problem such as a limitation of the toner amount and the like. However, since the print job is resultantly divided into plural ones and a job by a user is further interposed, there is a possibility that human errors occur.

Therefore, there is proposed the establishment of a printing system in which an electro-photographic apparatus using a colored toner and an electro-photographic apparatus using a clear toner are connected to perform production of an output matter using the clear toner all together (Japanese Patent Laid-Open No. 2008-145595). For example, for a user using the clear toner, there is provided a printing system of connecting the electro-photographic apparatus using the colored toner and the electro-photographic apparatus using the clear toner.

The printing system disclosed in Japanese Patent Laid-Open No. 2008-145595 is constructed in such a manner as to activate operations of two printing apparatuses with one user interface. However, there are some cases where the operability is further improved when the user interface is used for each apparatus. For example, if a paper jam occurs, monitoring the user interface in each apparatus is more convenient for a user to understand the operation condition and handle the problem. In general, documents describing conventional technologies do not disclose the above technical concept.

Accordingly, for the user recognizing a condition of a print job executed by the printing system, it is required to operate two user interfaces by gathering information of the respective printing apparatuses displayed on the respective interfaces. However, there is a problem that the user has a difficulty in correctly understanding the processing condition of the printing job and correctly operating the user interface for completion of the print job. Therefore, the conventional technology does not improve the operability in the printing system.

SUMMARY OF THE INVENTION

For solving the above problem, the present invention provides a printing system in which a discharge unit of a first printing apparatus for performing a print using a first color material is connected to a feed unit of a second printing apparatus for performing a print using a second color material, a print of first printing data is performed in the first printing apparatus, the feed unit feeds a sheet carried from the discharge unit, and a print of second printing data generated from the same print job as the first printing data is performed in the second printing apparatus, wherein the first printing apparatus comprises: a first user interface for a user to operate and monitor the first apparatus; and an associating unit for associating the first printing data with the second printing data generated from the same print job as the first printing data, and the second printing apparatus comprises: a second user interface for the user to operate and monitor the second apparatus; a detecting unit for detecting an operating condition of the second apparatus; and a notifying unit for, when the operating condition of the second apparatus detected by the detecting unit shows an error occurrence and the job inputted into the printing system and associated by the associating unit is not completed without the error being removed, displaying information of a removal method for the error on the second user interface to notify the first printing apparatus of information of an error occurrence, wherein the first printing apparatus further comprises: a display unit for displaying information of the error occurrence in the second printing apparatus notified by the notifying unit on the first user interface.

According to the present invention, also in the printing system in which the two independent printing apparatuses are connected and cooperate to execute one print job, the two printing apparatuses can operate via one user interface so that a user can easily recognize an execution condition of the print job.

Further features of the present invention will become apparent from the following description of exemplary embodiments (with reference to the attached drawings).

DESCRIPTION OF THE EMBODIMENTS

Hereinafter, the best mode of carrying out the present invention will be explained with reference to the accompanying drawings.

A clear toner is used as a special printing agent in an embodiment, but a printing agent used is not limited thereto. For example, in addition to the clear toner, other transparent printing agents such as a light toner, a special color toner such as red and green, and transparent ink may be available.

In addition, the clear toner is a transparent printing agent which can add transparency for an printed image. Viewer is also hard to distinguish a region printed by the clear toner. Furthermore, the clear toner can express a glossy feeling or a shiny feeling different from a print with a colored toner alone.

The printing apparatus may be any apparatus which can print out input data, such as a multifunction complex machine (hereinafter, called MFP) achieving multiple functions such as copying, printing and faxing with a single machine.

Figure 1:
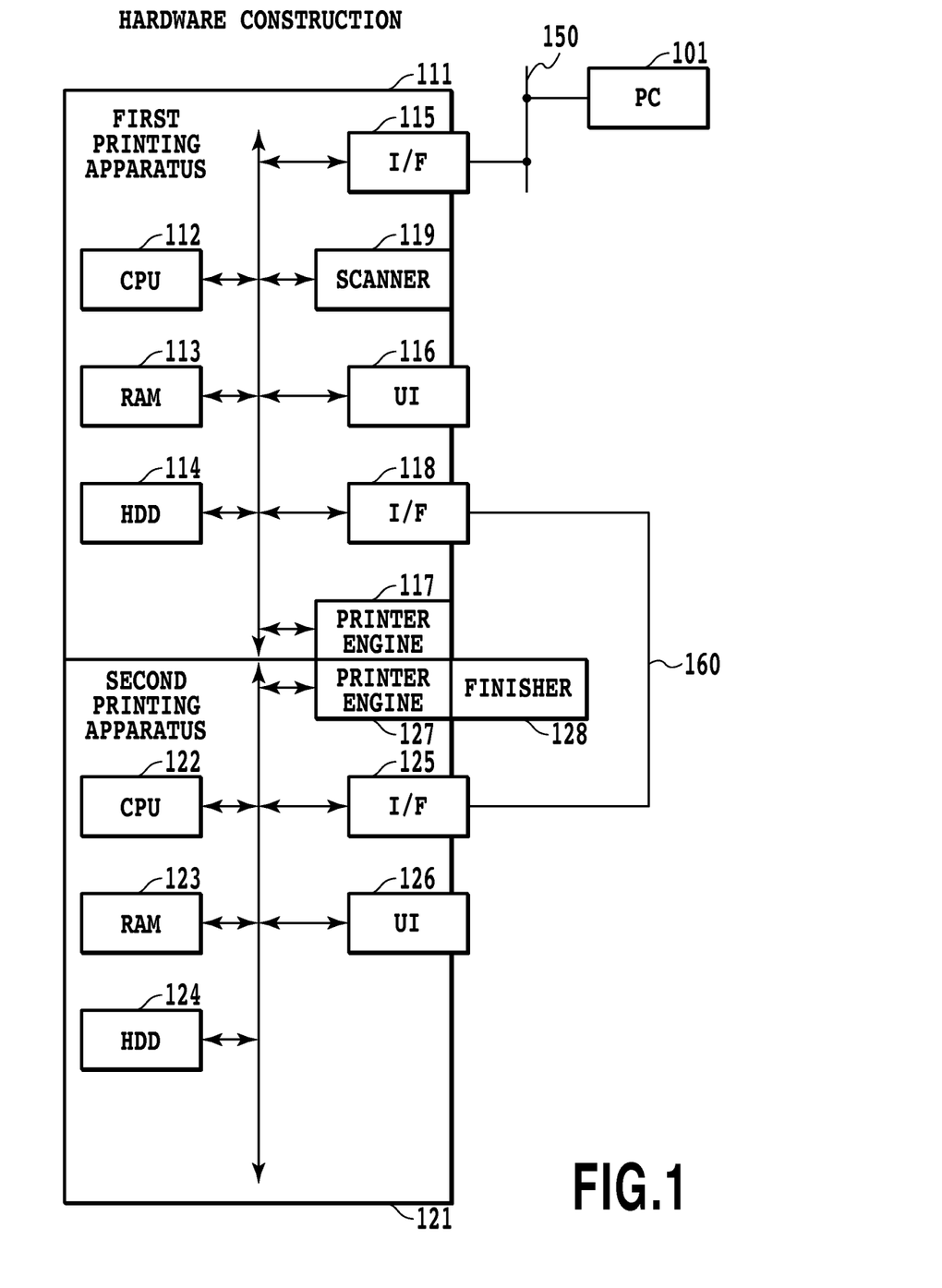
FIG. 1 is a hardware configuration diagram in a printing system applied to the present invention.

FIG. 1 is a hardware configuration diagram showing the configuration of a printing system according to the present embodiment. As shown in FIG. 1, a discharge unit in a first printing apparatus 111 is connected to a feed unit in a second printing apparatus 121. A print sheet printed by the first printing apparatus 111 is carried to the feed unit of the second printing apparatus 121. The second printing apparatus 121 performs a print using this carried print sheet.

The first printing apparatus 111 is connected to a PC 101 of a host apparatus. Also, the first printing apparatus 111 is able to perform printing on a sheet, using monochrome or color (YCMK). In the present embodiment, the printer is a color printer provided with a four-drum configuration using colored (YCMK) toners. A CPU 112 of the first printing apparatus 111 executes apart of a software module shown in FIG. 2 and executes the process according to flow charts in FIGS. 3, 6 and 7. A RAM 113 is used as a work area by the CPU 112. Software and data are stored in a HDD 114 or the RAM 113. A communications interface 115 is connected to an external network 150 to communicate with the PC 101 or the like. When a user operates the first printing apparatus 111 through a first user interface (hereinafter, first UI) 116, the result of the software processing is displayed on a screen. Therefore, the user can operate an operating/monitoring apparatus through the first UI to monitor an operating condition/situation. The printing apparatus 111 is connected to the second printing apparatus 121 through a dedicated line 160 to communicate with the second printing apparatus 121 through a communications interface 118. The printing apparatus 111 further comprises a printer engine 117 and a scanner 119.

In the present embodiment, the second printing apparatus 121 connected to the first printing apparatus 111 is constructed of one drum, and can print a clear toner on a sheet. The second printing apparatus 121 feeds the printed sheet on which the first printing apparatus 111 has performed a monochrome or color printing according to a print instruction from a user through the PC 101 or the first UI 116. Then, the second printing apparatus 121 prints on the feeding sheet using the clear toner and discharges the printed sheet. In the printing system of the present embodiment provided with the configuration shown in each figure, a print using the monochrome or color toner and a print using the clear toner are performed as a series of the cooperative jobs. A printer for performing a print using another special color toner may be used as the second printing apparatus 121.

Figure 2:
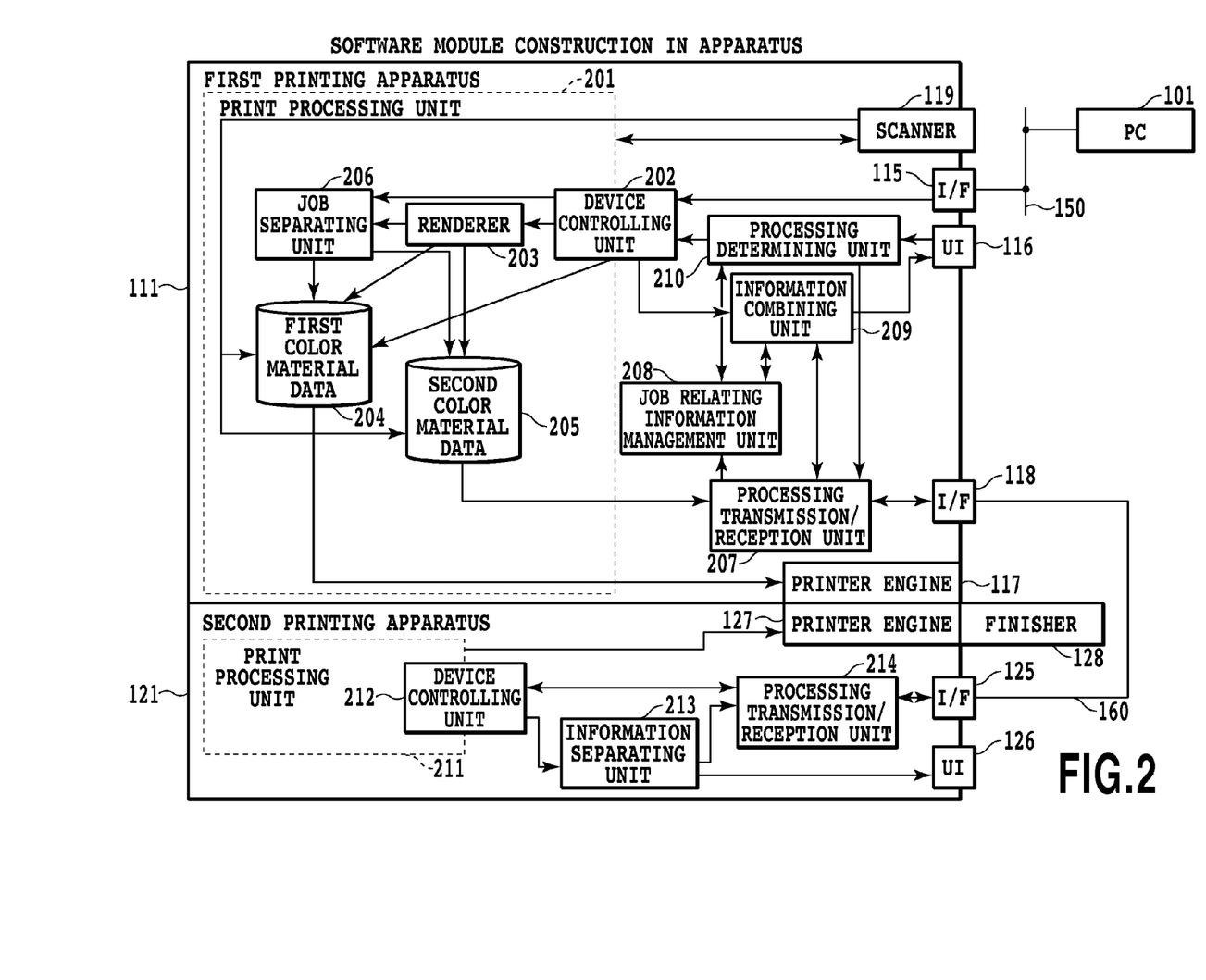
FIG. 2 is a software configuration diagram in a printing system according to the present invention.
Figure 4:
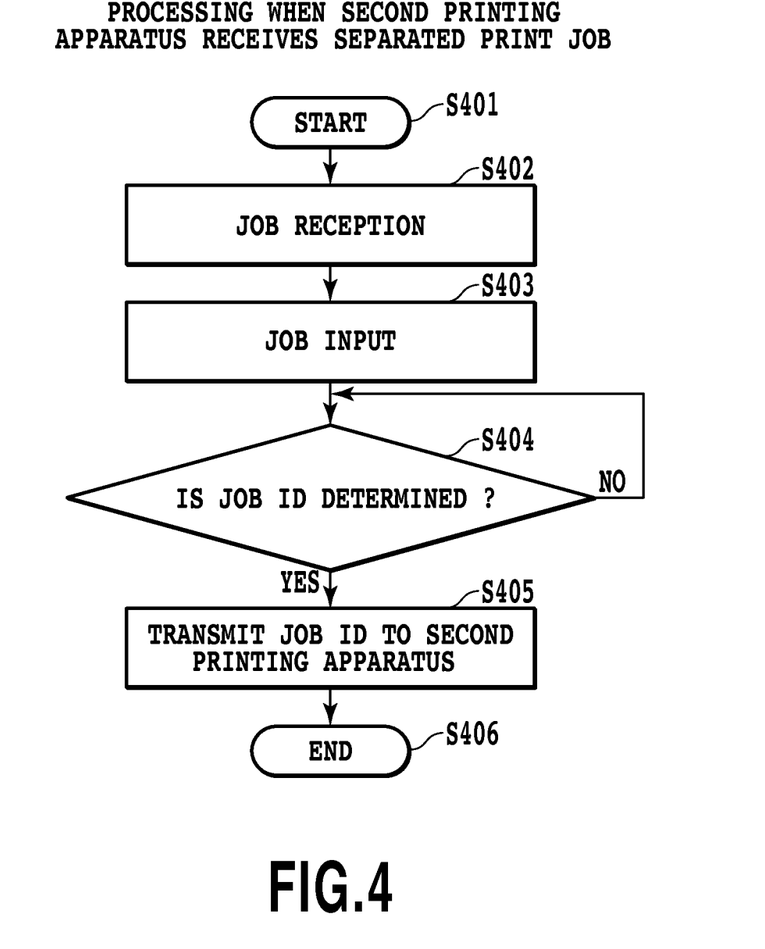
FIG. 4 is a flow chart in the first embodiment of the present invention.
Figure 5:
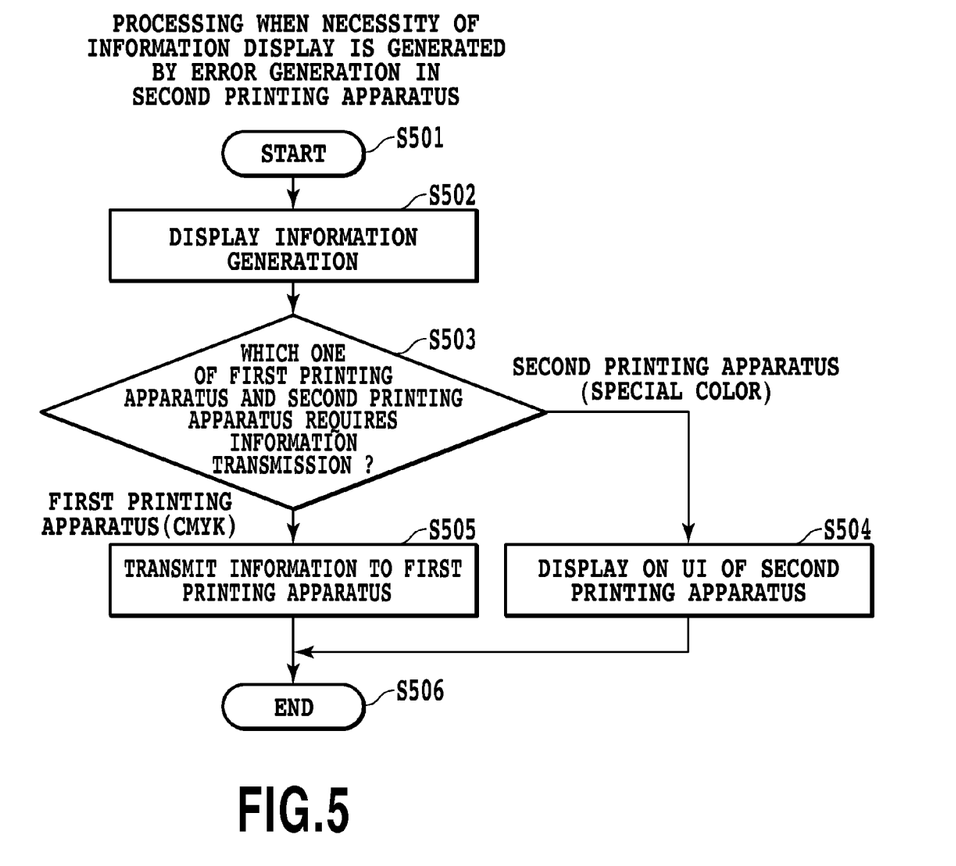
FIG. 5 is a flow chart in the first embodiment of the present invention.

A CPU 122 of the second printing apparatus 121 executes a part of a software module shown in FIG. 2 and executes the processing according to flow charts in FIGS. 4 and 5. A RAM 123 is used as a work area by the CPU 122. Software and data are stored in a HDD 124 or the RAM 123. The second printing apparatus 121 communicates with the first printing apparatus 111 through a communications interface 125. The second printing apparatus 121 is further provided with a second UI 126 as a second user interface, a printer engine 127 and finisher 128.

In the first printing apparatus 111 and the second printing apparatus 121, each portion on a route of a print sheet is provided with a jam sensor (not shown). Each of the first printing apparatus 111 and the second printing apparatus 121 may be provided with a toner remaining sensor of each color, a feed sensor, a discharge sensor, a needle clogging sensor, a print sheet counter (each not shown), and the like.

FIG. 2 is a configuration diagram of a software module according to the present embodiment.

In the first printing apparatus 111, a device controlling unit 202 functions as an interface to correspond to various types of commands. In the second printing apparatus 121, a device controlling unit 212 functions as an interface to correspond to various types of commands. Print processing units 201 and 211 and the device controlling units 202 and 212 are software modules provided in the conventional technology. For example, the technology called CPCA (registered trademark; Canon Peripheral Control Architecture) is publicly disclosed as the device controlling unit 202 in the printing apparatus made by Canon (registered trademark) Co., Ltd.

First printing data 204 is data for performing a print using a color toner as a first color material. Second printing data 205 is data for performing a print using a clear toner as a second color material.

The first printing data 204 and the second printing data 205 are generated from the same print job, and then both the first printing data 204 and the second printing data 205 are printed, thus completing one job. A renderer 203, the first printing data 204, the second printing data 205 and a job separating unit 206 separate a print job inputted into the first printing apparatus 111 into the first printing data 204 and the second printing data 205. The second printing data 205 is defined as a print job of the second printing apparatus 121.

Alternatively, it may be possible that the first printing data 204 and the second printing data 205 are generated as the result of the renderer 203. In addition, data scanned by the scanner 119 may be stored as the first printing data 204 and the second printing data 205.

A job relating information management unit 208 retains relevant information of a job processed by the first printing apparatus 111 and a job processed by the second printing apparatus 121. An information combining unit 209 combines state information, job information and jam information from the device controlling unit 202 in the first printing apparatus 111 and state information, job information and jam information from the device controlling unit 212 in the second printing apparatus 121. A processing determining unit 210 determines whether or not it is necessary to process/set a processing/setting value inputted from the first UI 116 also to the second printing apparatus 121 in common.

It should be noted that "combining" in the present specification and in the accompanying drawings means to integrate information in regard to a single printing system where the first printing apparatus 111 and the second printing apparatus 121 are connected, based on each information on the first printing apparatus 111 and the second printing apparatus 121. In addition, "combining" is performed by selecting which one of respective pieces of information in regard to the first printing apparatus 111 and the second printing apparatus 121 indicates optimum information in order to enhance convenience of a user using the first UI 116.

An information separating unit 213 determines whether state information, job information, jam information or the like in the second printing apparatus 121 is displayed on the first UI 116 in the first printing apparatus 111 or on the first UI 126 in the second printing apparatus 121 from a viewpoint of usability. A processing transmission/reception unit 214 transmits a job ID of the second printing apparatus 121 to a processing transmission/reception unit 207 to be notified to the first printing apparatus 111. The processing transmission/ reception unit 214 receives a request from the processing transmission/reception unit 207.

Figure 3:
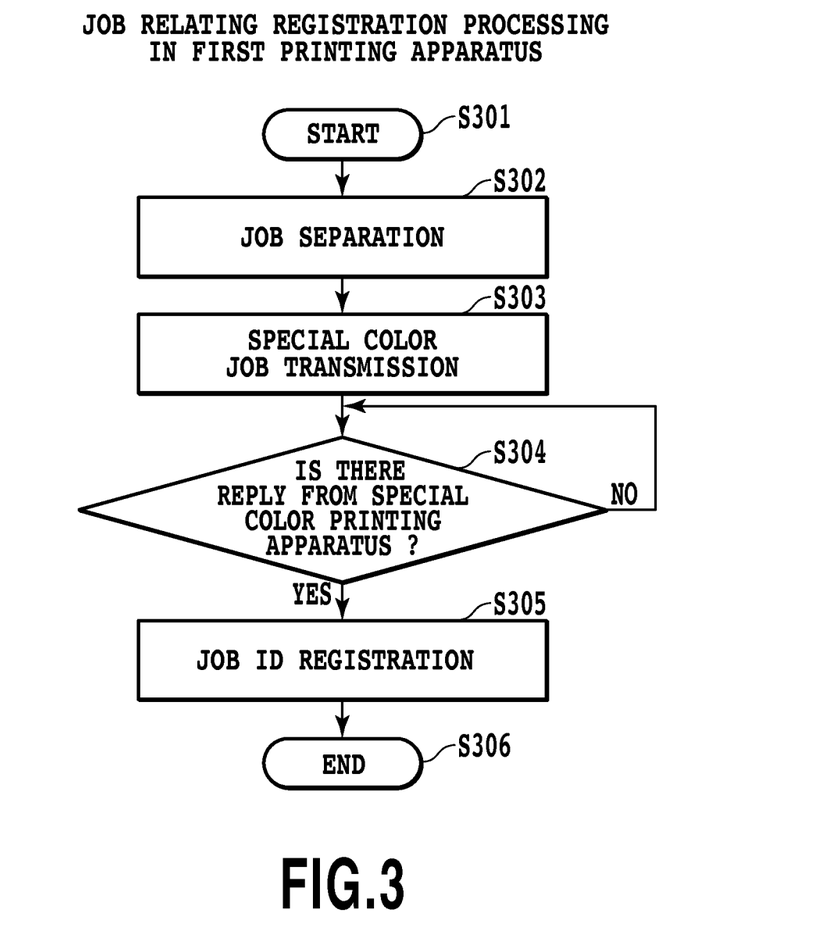
FIG. 3 is a flow chart in a first embodiment of the present invention.

FIG. 3 is a flow chart showing the processing procedure until registering relevant information showing a relation between a job of the first printing apparatus 111 and a job of the second printing apparatus 121 to the job relating information management unit 208 in the present embodiment.

When a print job is inputted into the first printing apparatus 111 according to a print instruction from the PC 101 or the first UI 116, the job separating unit 206 executes a job separation (S302). That is, the inputted print job is divided into a print job (color job) of the first print data processed in the first printing apparatus 111 and a print job (special color, that is, clear job) of the second print data processed in the second printing apparatus 121. Then, the processing transmission/ reception unit 207 receives the print job for printing the second printing data separated in the job separating unit 206, which is transmitted to the second printing apparatus 121 (S303). The processing transmission/reception unit 207 determines whether or not job ID information of the second printing apparatus 121 is transmitted (S304). When the processing transmission/reception unit 207 receives the job ID information of the second printing apparatus 121, relevant information which has associated the job ID of the first printing apparatus 111 with the job ID of the second printing apparatus 121 is registered in the job relating management unit 208 (S305).

The job separating unit 206 executes the above processing, as well as the print processing of the first printing data 204 according to the conventional process.

FIG. 4 is a flow chart showing the processing procedure when the second printing apparatus 121 receives the print job separated and transmitted from the first printing apparatus 111.

First, the processing transmission/reception unit 214 receives the print job through the communications interface 125 (S402). The processing transmission/reception unit 214 inputs the received print job into the device controlling unit 212 (S403). When the print processing unit 211 certifies a job ID of the inputted job (S404), the processing transmission/ reception unit 214 subsequently transmits the job ID to the first printing apparatus 111 (S405).

The information in regard to an ID in the job in the second printing apparatus 121 of the second print job transmitted from the first printing apparatus 111 can be recognized also in the first printing apparatus from the flow charts in FIGS. 3 and 4.

FIG. 5 is a flow chart showing the processing procedure when necessity of an information display to a user occurs in the second printing apparatus 121.

When an error such as jams occurs in the middle of processing a print job in the second printing apparatus 121 (S502), error information is transmitted to the print processing unit 211 from a sensor (not shown) such as a jam sensor installed in the second printing apparatus 121 for sensing the error. This error information is transmitted to the device controlling unit 212, which is transmitted to the information separating unit 213. Next, at S503, the information separating unit 213 after the reception of the error information transmits the error information to the first printing apparatus 111. The device controlling unit 212 combines the error information with information relating to the first printing apparatus 111 and determines whether the combined information is displayed on the first UI 116 in the first printing apparatus 111 or on the second UI 126 in the second printing apparatus 121.

In regard to a determination criterion on which one of the apparatuses the combined information should be display, a determination algorithm will be explained with reference to a special example.

For example, it is assumed that a paper jam occurs in the second printing apparatus 121 and the information separating unit 213 receives the error information showing that the jam sensor (not shown) has detected the jam. In this case, unless the jam is removed, a series of cooperative jobs executed by both the first printing apparatus 111 and the second printing apparatus 121 are not completed.

Therefore, the information separating unit 213 which has received the error information determines that the generation information of the error occurred in the second printing apparatus 121 should be transmitted to the first printing apparatus 111 so that a user can confirm states of the two apparatuses all together simply by confirming the first UT 116. Convenience of the user can be improved by such a package display.

It should be noted that there are some cases where an animation guide for showing a user the jam processing procedure and a target element for processing the jam is displayed on the UI so that the user can handle the error such as a paper jam. In the event of displaying such an error removal method on the UI, the user removes the jam while confirming the animation guide. Therefore, when the animation guide is displayed on the UI of the device in which the jam occurs, a distance between the user and the UI is short, which therefore is convenient for the user so that the user is easy to view the animation guide. Therefore, in regard to the UI display using display data specific to such a device, data is transmitted to the first UI 116 in the printing apparatus 111 connected to the device in which the jam is generated in such a manner as to display the error generation information called "jam generation" from the second printing apparatus 121. In addition, it is possible to display the error removal method using a guide such as animations or drawings on the second UI 126 in the device in which the jam occurs.

Making the notice of the jam in this way can prevent loads of the CPU and the memory from increasing.

On the other hand, for example, when a warning in regard to a low amount of the toner is displayed in the second printing apparatus 121, since the warning information is still in the warning level, a series of the cooperative jobs may be completed without immediately performing a toner resupply. Since there is less need in this case for displaying the information in regard to the warning of the low amount of the toner on the first UI 116, the information separating unit 213 determines that it is sufficient if the warning information is displayed on the second UI 126 in the second printing apparatus 121 alone.

When the display information relating to the second printing apparatus 121 includes the error which indicates that the entirety of the inputted print jobs has not been completed, it is determined that the information in regard to the second printing apparatus 121 is also displayed on the first UI 116 (S503). In consequence, only if the user confirms the first UI 116 in the first printing apparatus 111 connected to the second printing apparatus 121, all the pieces of the information in the printing system can be confirmed.

On the other hand, when the display information is not the error which indicates that the entirety of the inputted print jobs has not been completed, it is determined to display the information in regard to the second printing apparatus 121 on the second UI 126 only.

Further, when the separated job to be executed by the second printing apparatus 121 is also completed, the display information is generated. Since this information is linked to a series of the cooperative jobs to be executed by the entire system, the information separating unit 213 determines that this information should be displayed on the first UI 116 in the first printing apparatus 111 (S502, S503 and S505).

If it is determined that the information display is necessary in the second printing apparatus 121 at step S503, the information separating unit 213 displays the information on the second UI 126 (S504). On the other hand, if it is determined that the information display is necessary in the first printing apparatus 111, the information separating unit 213 requests the processing transmission/reception unit 214 to transmit the information, and the processing transmission/reception unit 214 transmits the information to the first printing apparatus 111 (S505).

Figure 6:
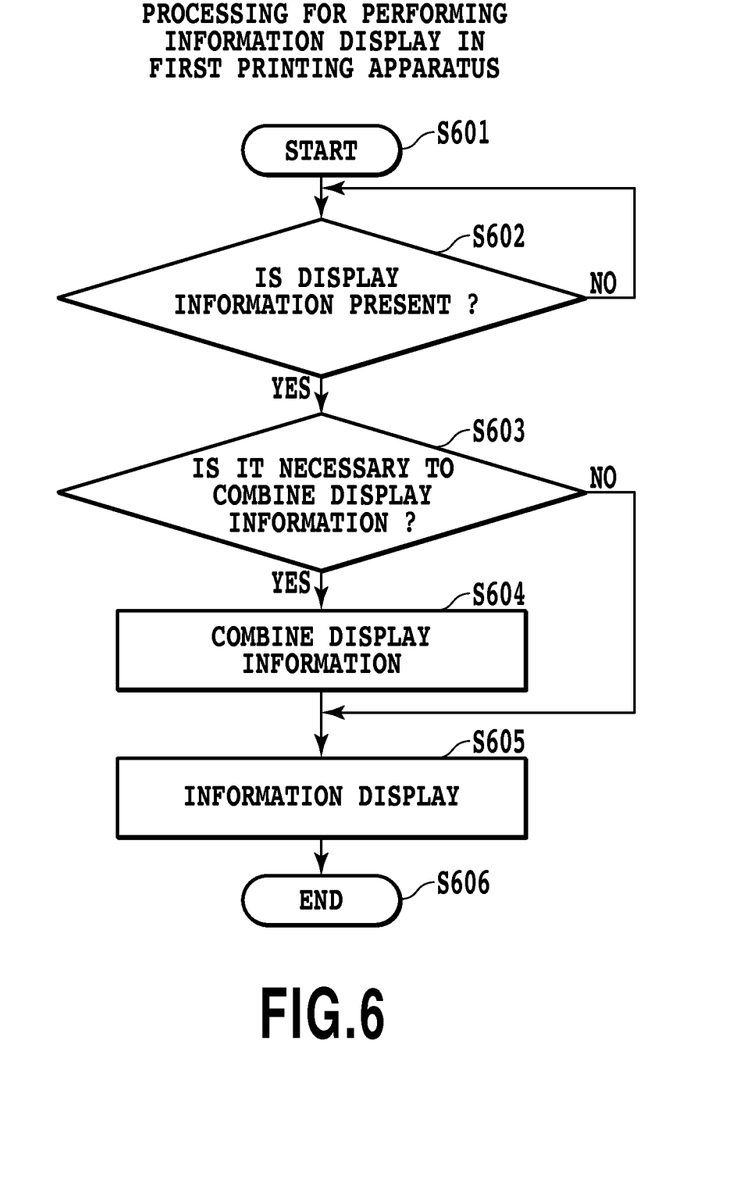
FIG. 6 is a flow chart in the first embodiment of the present invention.

FIG. 6 is a flow chart showing the processing procedure during the time of performing the information display using the first UI in the first printing apparatus 111 in the present embodiment.

When an error such as a paper jam occurs in the first printing apparatus 111 or/and in the second printing apparatus 121 in the middle of processing the separated print job in the first printing apparatus 111 (S602), the information combining unit 209 receives error information (S602).

The error information received by the information combining unit 209 includes two kinds of information. One is information on an error occurred in the first printing apparatus 111. The display information for displaying information on the first printing apparatus 111 generated in the first printing apparatus 111 using the first UI in the first printing apparatus 111 is transmitted from the device controlling unit 202 to the information combining unit 209. The other one is error information showing an error occurred in the second printing apparatus 121 shown in FIG. 5. In order to display the display information including this error information on the first UI 116, the processing transmission/reception unit 207 receives the error information from the second printing apparatus 121 and transmits this error information to the information combining unit 209.

The information combining unit 209 combines the received display information and then determines whether or not the combined display information should be displayed on the first UI 116 based upon conditions of the first printing apparatus 111 and the second printing apparatus 121 (S603).

In regard to the determination criterion, a determination algorithm will be explained with reference to a concrete example.

For example, there will be explained a case of taking a print job for further performing a print using a clear toner on the sheet printed using CMYK toners in the first printing apparatus 111, as a processing target.

Even if the information showing that the job processed by the first printing apparatus 111 has been completed in the first printing apparatus 111 is transmitted to the information combining unit 209, the job has not been completed because the printing using the clear toner is not completed in the second printing apparatus 121. Thus, "job completion" is not displayed.

In this case, the information in regard to the job executed by the first printing apparatus 111 and the information in regard to the job executed by the second printing apparatus 121 are preferably combined for display. That is, the information display of "job completion" as the entire system should be made from the second printing apparatus 121 when the job to be processed by the second printing apparatus 121 is completed and the information display request in regard to this completion is generated. Therefore, on the UI 116 in the first printing apparatus 111, the display is made after confirming the condition of the second printing apparatus 121. At this time, the processing determining unit 210 determines relativity of the job based upon ID information registered in the job relating information management unit 208.

On the other hand, for example, when the information combining unit 209 receives the information that a jam has occurred in the first printing apparatus 111, the job can not be completed as the entire system regardless of the condition of the second printing apparatus 121. Therefore, the processing determining unit 210 determines that the information on the jam in the first printing apparatus 111 should be immediately displayed on the first UI without detecting the condition of the second printing apparatus 121.

It should be noted that since "job completion" is the information displayed as the entire system in the present printing system, it is not necessary to display the information showing whether "jam completion" is the information of either the first printing apparatus 111 or the second printing apparatus 121. However, it goes without saying that if the information to be displayed relates to a jam error, it is necessary to add information showing whether the information in regard to occurrence of an error such as "location of jam occurrence" relates to either the first printing apparatus 111 or the second printing apparatus 121.

In this way, regarding to all the display information, it is determined whether the received information should be displayed as it is or after the information of the first printing apparatus 111 and the information of the second printing apparatus 121 are combined, at step S603. When it is determined that the display should be made after the two pieces of the display information are combined, the information combining unit 209 executes the display combining processing in accordance with the information (S604).

Next, the combining algorithm will be explained with reference to a concrete example.

As described above, when executing the job which will be completed by using the two apparatuses, after the job executed by the first printing apparatus 111 is completed, the first printing apparatus 111 makes a requests for displaying "job completion". In this case, the display is not immediately made based upon the request, but the display combining processing in regard to "job completion" is executed at the time of further receiving the request for displaying "job completion" from the second printing apparatus 121.

When displaying processing-completion estimating time, the combining processing is executed in such a manner as to add processing-completion estimating time in regard to a separation job to be executed in the first printing apparatus 111 and processing-completion estimating time in regard to a separation job to be executed in the second printing apparatus 121.

The display information combined by the information combining unit 209 is displayed on the first UI 116 at step S605.

Figure 7:
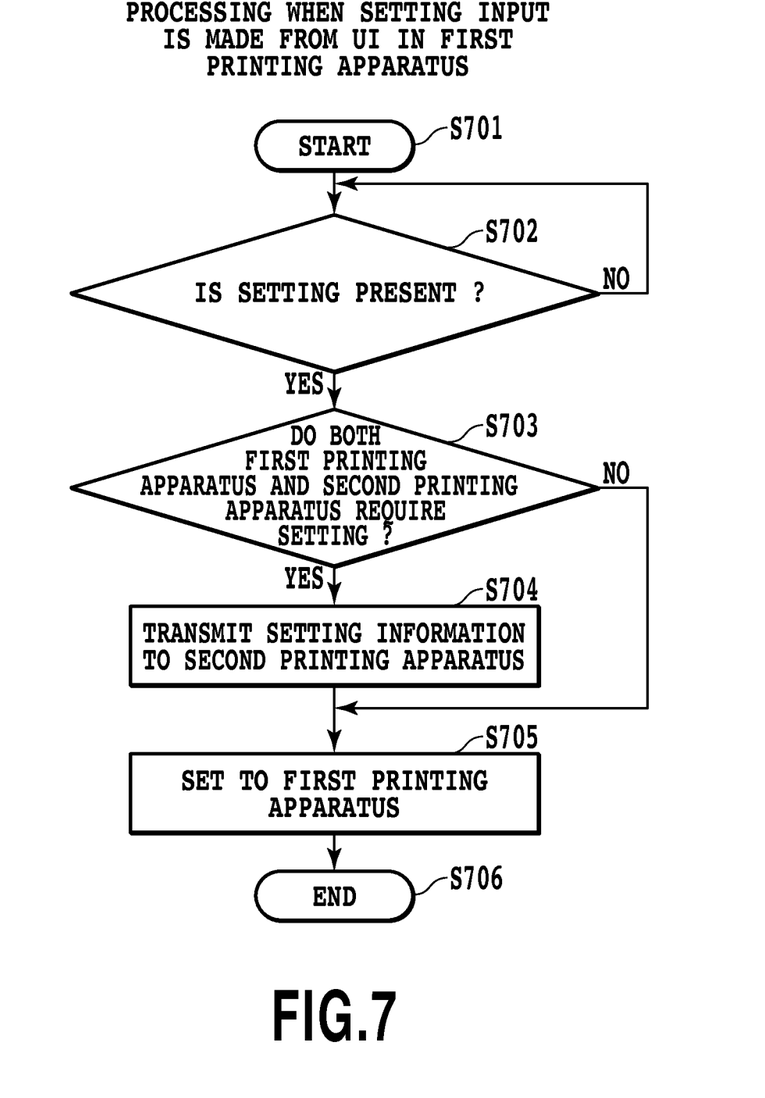
FIG. 7 is a flow chart in the first embodiment of the present invention.

FIG. 7 is flow chart showing the processing procedure at the time of performing a print setting through the first UI 116 in the first printing apparatus 111 by a user.

When a user performs a print setting through the first UI 116 (S702), the processing determining unit 210 determines whether the performed setting should be performed in common to the second printing apparatus 121 or to the first printing apparatus 111 alone (S703).

In regard to this determination criterion, a determination algorithm will be explained with reference to a concrete example.

For example, when executing a job of further performing a print using a clear toner on a sheet printed by using CMYK toners in the first printing apparatus 111, an example of setting the number of print copies to this job will be explained. In this case, when the same data is not printed also in the second printing apparatus 121 by the same sheet number as in the first printing apparatus 111, the sheets on each of which a print is performed using the CMYK toner and the sheets on each of which a print is performed using the clear toner are combined out of alignment. Therefore, the information showing the same number of print copies as the number of print copies set to the first printing data to be processed in the first printing apparatus 111 is transmitted to the second printing apparatus 121. In this way, the number of print copies must be set in common to the second printing data associated with the first printing data.

In addition, another example of setting color processing will be explained. In this case, since the color processing setting or the like is a setting to the printer engine 117, it is not necessary to perform the setting to the printer engine 127 in the second printing apparatus 121. Accordingly, the setting to the second printing apparatus 121 should be performed independently of the setting to the first printing apparatus 111.

In this way, the processing determining unit 210 determines whether the setting must be performed to the first printing apparatus 111 or must be performed in common also to the second printing apparatus 121 at step S703.

If it is determined that the common setting is necessary to both the apparatuses at step S730, the processing determining unit 210 requests the processing transmission/reception unit 207 to transmit the setting information to the second printing apparatus 121. In addition, the processing transmission/reception unit 207 transmits the setting information set through the first UI 116 to the second printing apparatus 121 (S704).

On the other hand, in a case where it is determined that the common setting is not necessary, the setting in step S702 is performed to the first printing apparatus 111 alone (S705).

It should be noted that the processing of executing the setting to the first printing apparatus 111 at step S702 may be executed immediately after step S702.

Hereinafter, there will be explained the processing that the second printing apparatus 121 receives the setting information transmitted at step S704. This processing realizes by executing the software module stored in any one of the RAM 123 and the HDD 124 using the RAM 123 as a work area work by the CPU 122.

First, the processing transmission/reception unit 214 receives the setting information from the first printing apparatus 111. Next, the processing transmission/reception unit 214 performs the setting to the device controlling unit 212 according to the transmitted common setting information.

As described above, even in the printing system connecting the two printing apparatuses each having the independent UI, it is possible to issue the print instruction from the UI of the one printing apparatus, thus improving operability of a user. In addition, since the information made to be displayed on the independent UI is displayed on the one UI, the operability of the user can be improved. On this occasion, it is possible to control the combination of the information displayed on the UI by the generated display information.

Other Embodiment

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-046409, filed Mar. 3, 2010, which is hereby incorporated by reference herein in its entirety.

What is claimed is:
1. A printing system comprising:
a discharge unit of a first printing apparatus that performs printing using a first color material, the discharge unit being connected to a feed unit of a second printing apparatus that performs printing using a second color material, wherein a print job of first printing data is performed in the first printing apparatus, wherein the feed unit feeds a sheet carried from the discharge unit, wherein a print job of second printing data, generated from a same print job as that of the first printing data, is performed in the second printing apparatus, wherein the first printing apparatus includes:
   a first user interface on which a user operates and monitors the first printing apparatus, and
   an associating unit that associates the first printing data with the second printing data generated from the same print job as that of the first printing data, wherein the second printing apparatus includes:
   a second user interface on which the user operates and monitors the second printing apparatus,
   a detector that detects an operating condition of the second printing apparatus, and
   a notifying unit that displays, when the operating condition of the second printing apparatus detected by the detector indicates an occurrence of an error that is not removed and a print job inputted into the printing system and associated by the associating unit is not completed information of a removal method for the error on the second user interface to notify the first printing apparatus of information of the occurrence of the error, wherein the first printing apparatus further includes a display apparatus that displays, on the first user interface, information of the occurrence of the error in the second printing apparatus notified of by the notifying unit, and wherein at least one of the units is implemented by a processor executing computer-executable code stored in a non-transitory computer-readable memory.

2. A printing system according to claim 1,
wherein the associating unit in the first printing apparatus is configured to:
   separate the print job into a print job for the first printing apparatus performing the print using the first color material and a print job for the second printing apparatus performing the print using the second color material,
   transmit the print job for the second printing apparatus to the second printing apparatus, and
   register a job ID of the print job obtained from the second printing apparatus associated with a job ID of the print job of the first printing apparatus to the transmission.

3. A printing system according to claim 1,
wherein the operating condition includes the occurrence of the error and completion of each print job for the first printing apparatus and the second printing apparatus, and
wherein the display apparatus combines information indicating that the first printing data is completed and information indicating that the second printing data is completed, and displays the combined information on the first user interface, when the print of the first printing data in the first printing apparatus is completed and completion of the second printing data in the second printing apparatus is notified of by the notifying unit.

4. A printing system according to claim 1,
wherein the operating condition includes the occurrence of the error, and
wherein the second printing apparatus further includes a display apparatus that displays information of the occurrence of the error on the second user interface without transmitting the information to the first printing apparatus, when it is determined that the print job can be completed in a state where the error detected by the detector occurs in the second printing apparatus.

5. A printing system according to claim 1, wherein the first printing apparatus further includes a display apparatus that displays an error on the first user interface without receiving notice of the operating condition of the second printing apparatus, when the error is detected in the first printing apparatus.

6. A printing system according to claim 1,
wherein the first printing apparatus further includes:
   a determining unit determining whether or not a print setting is performed to the second printing data associated with the first printing data by the associating unit after the print setting inputted through the first user interface to the first printing data is performed, wherein
   the notifying unit notifies of the print setting, when the determining unit determines that the print setting performed to the first printing data is performed to the second printing data.

7. A printing system according to claim 1, wherein the second printing apparatus further includes a unit performing a print setting to the second printing apparatus according to the print setting from the second user interface.

8. A printing method in a printing system, the printing system including a first printing apparatus that prints using a first color material and a second printing apparatus that prints using a second color material, the first printing apparatus including a discharge unit and a first user interface on which a user operates and monitors the first printing apparatus, the second printing apparatus including a feed unit and a second user interface on which a user operates and monitors the second printing apparatus, the discharge unit and the feed unit being connected to each other, the feed unit being structured to carry a sheet printed by the first printing apparatus of first printing data from the discharge unit, the second printing apparatus printing second printing data, the second printing data being generated based on a print job in accordance with first printing data, the printing method comprising steps of:
   associating the first printing data with the second printing data generated from a same print job as that of the first printing data;
   detecting an operating condition of the second printing apparatus;
   displaying information of a removal method for an error on the second user interface, when the operating condition of the second printing apparatus detected in the detecting step indicates an occurrence of an error that is not removed and the print job inputted into the printing system and associated by the associating unit is not completed;
   notifying the first printing apparatus of information of the occurrence of the error; and
   displaying, on the first user interface in the first printing apparatus, information of the occurrence of the error in the second printing apparatus notified of in the notifying step.

9. A non-transitory computer-readable medium storing a program that when executed causes a computer to perform a printing method of a printing system in a first printing apparatus, the printing system including the first printing apparatus that prints using a first color material and a second printing apparatus printing by using a second color material, the first printing apparatus including a discharge unit and a first user interface on which a user operates and monitors the first printing apparatus, the second printing apparatus including a feed unit and a second user interface on which a user operates and monitors the second printing apparatus, the discharge unit and the feed unit being connected to each other, the feed unit being structured to carry a sheet printed by the first printing apparatus of first printing data from the discharge unit, the second printing apparatus printing second printing data, the second printing data being generated based on a print job in accordance with first printing data, the printing method comprising steps of:

associating the first printing data with the second printing data generated from a same print job as that of the first printing data; and displaying, on the first user interface, information of an occurrence of an error in the second printing apparatus notified of in the first printing apparatus.

10. A non-transitory computer-readable medium storing a program that when executed causes a computer to perform a printing method of a printing system in a second printing apparatus, the printing system including a first printing apparatus that prints using a first color material and the second printing apparatus that prints using a second color material, the first printing apparatus including a discharge unit and a first user interface on which a user operates and monitors the first printing apparatus and a discharge unit, the second printing apparatus including a feed unit and a second user interface on which a user operates and monitors the second printing apparatus, the discharge unit and the feed unit being connected to each other, the feed unit being structured to carry a sheet printed by the first printing apparatus of first printing data from the discharge unit, the second printing apparatus printing second printing data, the second printing data being generated based on a print job in accordance with first printing data, the printing method comprising steps of:

detecting an operating condition of the second printing apparatus;

displaying information of a removal method for an error on the second user interface, when the operating condition of the second printing apparatus detected in the detecting step indicates an occurrence of an error that is not removed and the print job inputted into the printing system and associated with second printing data is not completed; and notifying the first printing apparatus of information of the occurrence of the error.

11. A printing system including a discharge unit of a first printing apparatus that performs printing using a first color material, the discharge unit being connected to a feed unit of a second printing apparatus that performs printing using a second color material, a print job of first printing data being performed in the first printing apparatus, the feed unit feeds a sheet carried from the discharge unit, and a print job of second printing data, generated from a same print job as that of the first printing data, being performed in the second printing apparatus, the printing system comprising:

a detector that detects an error of an operating condition in the first printing apparatus or in the second printing apparatus, or both in the first printing apparatus and the second printing apparatus; and a display apparatus that displays, on an interface, which is provided in each of the first printing apparatus and the second printing apparatus, information of the error detected by the detector, wherein, when the error of the operating condition in the second printing apparatus is detected by the detector, the display apparatus displays information indicating that the error has occurred on the interface of the first printing apparatus and displays a recovery method for the error on the interface of the second printing apparatus.

12. A printing method in a printing system including a discharge unit of a first printing apparatus that performs printing using a first color material, the discharge unit being connected to a feed unit of a second printing apparatus that performs printing using a second color material, a print job of first printing data being performed in the first printing apparatus, the feed unit feeds a sheet carried from the discharge unit, and a print job of second printing data, generated from a same print job as that of the first printing data, being performed in the second printing apparatus, the printing method comprising steps of:

detecting an error of an operating condition in the first printing apparatus or in the second printing apparatus, or both in the first printing apparatus and the second printing apparatus; and displaying, on an interface, which is provided in each of the first printing apparatus and the second printing apparatus, information of the error detected at the detecting step, wherein, when the error of the operating condition in the second printing apparatus is detected in the detecting step, the displaying step includes displaying information indicating that the error has occurred on the interface of the first printing apparatus and displaying a recovery method for the error on the interface of the second printing apparatus.

* * * * *